United States Patent [19]

Katsube et al.

[11] 4,102,696

[45] Jul. 25, 1978

[54] DIELECTRIC CERAMIC COMPOSITION FOR HIGH FREQUENCIES

[75] Inventors: Masayoshi Katsube, Youkaichi; Youhei Ishikawa, Kyoto; Hiroshi Tamura, Omihachiman; Kunisabro Tomono, Kyoto, all of Japan

[73] Assignee: Murata Manufacturing Co., Ltd., Nagaokakyo, Japan

[21] Appl. No.: 709,502

[22] Filed: Jul. 28, 1976

[30] Foreign Application Priority Data

| | | | |
|---|---|---|---|
| Jul. 31, 1975 | [JP] | Japan | 50-93983 |
| Jul. 31, 1975 | [JP] | Japan | 50-93984 |
| Jul. 31, 1975 | [JP] | Japan | 50-93985 |
| Jul. 31, 1975 | [JP] | Japan | 50-93986 |

[51] Int. Cl.[2] .......... C04B 35/00; H01B 1/06; H01B 3/02

[52] U.S. Cl. .......... 106/73.2; 106/73.3; 252/520; 252/63.5

[58] Field of Search .......... 106/73.3, DIG. 5, 73.2; 252/520, 63.5

[56] References Cited

U.S. PATENT DOCUMENTS

| | | | |
|---|---|---|---|
| 2,668,118 | 2/1954 | Jonker | 106/73.3 |
| 2,962,452 | 11/1960 | Counts et al. | 252/520 |

FOREIGN PATENT DOCUMENTS

| | | | |
|---|---|---|---|
| 1,386,509 | 3/1975 | United Kingdom | 106/73.3 |

*Primary Examiner*—Patrick P. Garvin
*Assistant Examiner*—William G. Wright
*Attorney, Agent, or Firm*—Birch, Stewart, Kolasch and Birch

[57] ABSTRACT

A dielectric ceramic composition for high frequencies consisting essentially of 83 to 99.8 wt% of a basic composition composed of 22 to 43 wt% of titanium dioxide, 38 to 58 wt% of zirconium dioxide and 9 to 26 wt% of stannic oxide, and 0.2 to 17 wt% of one or two addditives selected from the group consisting of lanthanum oxide, cobaltic oxide and zinc oxide. The dielectric ceramic composition has high permittivity and high Q and is suitable for use as dielectric resonators in microwave bandpass filters, or as antennas employed at microwave frequencies, or as substrates for microwave circuits.

5 Claims, No Drawings

DIELECTRIC CERAMIC COMPOSITION FOR HIGH FREQUENCIES

BACKGROUND AND SUMMARY OF THE INVENTION

This invention relates to a dielectric ceramic composition for high frequencies. More particularly, the invention relates to a dielectric ceramic composition for microwave devices designed to operate at frequencies of 300 MHz to 30 GHz, having high permittivity and high Q and being stable in temperature characteristics.

Recently, it has been attempted to miniaturize microwave circuits with the advance of technology in high frequency circuits designed to operate at microwave and millimeter wave frequencies having a wave length of not more than several ten centimeters.

In such high frequency circuits, there have been used cavity resonators and antennas. However, such conventional elements must have the sizes corresponding to the wave lengths of microwaves so that the use of such elements is an obstacle to miniaturize the circuits. In order to overcome such a disadvantage, it has been proposed to use dielectric ceramic materials in place of conventional metal materials. Many of the dielectric ceramic materials commonly used consist essentially of compositions of the titanate system, such as $CaTiO_3$-$MgTiO_3$-$La_2O_3 \cdot 2TiO_2$ or $MgTiO_3$-$CaTiO_3$. It is, however, impossible with such compositions to produce dielectric elements having adequate characteristics required for the application to the microwave devices. Although the dielectric materials are required to have low dielectric loss, high permittivity and small temperature coefficient of permittivity, none of said compositions have sufficient characteristics which satisfy the above requirements, simultaneously.

It is therefore an object of the present invention to provide a dielectric ceramic composition for high frequencies having high permittivity and high Q (i.e., low dielectric loss).

Another object of the present invention is to provide a dielectric ceramic composition for high frequencies having small temperature coefficient of resonant frequency.

A further object of the present invention is to provide a dielectric ceramic composition for high frequencies which makes it possible to obtain dielectric ceramic elements having an optional temperature coefficient of resonant frequency in the range of from $-20 \times 10^{-6}$/° C to $+56 \times 10^{-6}$/° C by the variation of the compositional proportions.

According to the present invention, there is provided a dielectric ceramic composition for high frequencies consisting essentially of 83 to 99.8 wt% of a basic composition composed of 22 to 43 wt% of titanium dioxide ($TiO_2$), 38 to 58 wt% of zirconium dioxide ($ZrO_2$) and 9 to 26 wt% of stannic oxide ($SnO_2$), and 0.2 to 17 wt% of one or two additive selected from the group consisting of lanthanum oxide ($La_2O_3$), cobaltic oxide ($Co_2O_3$) and zinc oxide (ZnO).

When lanthanum oxide is used alone as the additive, the content thereof is preferably from 0.5 to 10 wt%. However, when lanthanum oxide is used together with zinc oxide as the additive, the content thereof is preferably not more than 2 wt%. When cobaltic oxide is used alone or together with zinc oxide as the additive, the content thereof is preferably not more than 10 wt%. When zinc oxide is used alone or together with lanthanum oxide or cobaltic oxide as the additive, the content thereof is preferably not more than 7 wt%. However, when zinc oxide is used alone, the content thereof is preferably not less than 1.2 wt%.

The above-mentioned limitation on the proportion of the constituents is required for the following reasons.

If titanium dioxide is less than 22 wt%, the permittivity of the products becomes small while on the other hand larger amount than 43 wt% causes the great increase of the temperature coefficient of resonant frequency. If zirconium dioxide is present in an amount less than 38 wt% or more than 58 wt%, the temperature coefficient of resonant frequency becomes too large. If stannic oxide is present in an amount smaller than 9 wt%, Q becomes small, and larger amount than 26 wt% causes the increase of the temperature coefficient of resonant frequency.

In cases where lanthanum oxide is used alone as the additive, if lanthanum oxide present is smaller than 0.5 wt%, the sintering of the product becomes insufficient, resulting in the deterioration of the permittivity and Q while on the other hand larger amount than 10 wt% causes the deterioration of Q. In cases where lanthanum oxide is used together with zinc oxide as the additive, if lanthanum oxide present is larger than 2 wt%, it causes the deterioration of Q.

In cases where cobaltic oxide is used alone or together with zinc oxide as the additive, if cobaltic oxide present is larger than 10 wt%, it causes the deterioration of the permittivity and Q. In cases where cobaltic oxide is used alone, if cobaltic oxide present is samller than 0.2 wt%, it is impossible to obtain a sufficiently sintered ceramic body.

In cases where zinc oxide is used alone or together with lanthanum oxide or cobaltic oxide as the additive, if zinc oxide present is larger than 7 wt%, it causes the deterioration of the permittivity and Q. In cases where zinc oxide is used alone, if zinc oxide present is smaller than 1.2 wt%, it is impossible to obtain a sufficiently sintered ceramic body.

The dielectric ceramic compositions of the present invention may be prepared by technique conventionally employed for the production of dielectric ceramic compositions. A preferred method, however, hereinafter described, consists in the use of highly purified oxides.

The highly purified oxides, viz, $TiO_2$, $ZrO_2$, $SnO_2$, $La_2O_3$, ZnO are used as starting materials for the preparation of the dielectric ceramic materials of the examples shown in Tables 1 and 2. In each example, the mixture of powdered starting materials having the compositional proportion shown in Tables 1 and 2 was ball milled with water for 16 hours, then the resulting mixture was dehydrated, dried and molded into a disk having a diameter of 12 mm and a thickness of 5.5 mm under a pressure of 2500 kg/cm$^2$. The disk was sintered in natural atmosphere at 1320° C for 4 hours to convert it to a dielectric ceramic body.

The measurements of the electrical properties were made for each ceramic body of the examples. The results obtained are shown in Tables 1 and 2. The properties given in the tables are the permittivity, Q and temperature coefficient of resonant frequency at a microwave frequency of 7 GHz and at 25° C. In the tables, the asterisks (*) designate compositions beyond the scope of the present invention.

The permittivity and Q at microwave frequency were measured by the well-known dielectric resonant method. The temperature coefficient of resonant frequency, TC(*fo*), represents the change rate of the resonant frequency (*fo*) over the temperature range of from +25° to +85° C. The change rate of resonant frequency, TC(*fo*), on temperature was derived from the temperature coefficient of permittivity, TC(ε), and the temperature coefficient of expansion, α, of the ceramic body. Thus, the relationship between the temperature coefficient of resonant frequency, TC(*fo*), and the temperature coefficient of permittivity, TC(ε), is given by the equation:

$$TC(fo) = -\tfrac{1}{2}\, TC(\epsilon) - \alpha$$

It will be seen from the results shown in Tables 1 and 2 that according to the present invention it is possible to obtain dielectric ceramic compositions having high permittivity in the range of 29.3 to 44.2 and high Q in the range of 4100 to 9500 at microwave frequencies and at 25° C. In addition, the dielectric ceramic compositions of the present invention have small temperature coefficients of resonant frequency. Furthermore, according to the present invention it is possible to prepare a dielectric ceramic composition having an optional temperature coefficient of resonant frequency in the range of from $-20 \times 10^{-6}$/° C to $+56 \times 10^{-6}$/° C by the variation of the compositional proportions, thus making it possible to provide dielectric ceramic elements with the temperature compensating function for the other electrical elements in the high frequency circuits in which said ceramic elements are incorporated. Thus, the dielectric ceramic compositions according to the invention are suitable for use as dielectric resonators in microwave bandpass filters, or as antennas employed at microwave frequencies, or as substrates for microwave circuits.

Table 1

| Ex. | Basic composition (wt %) $TiO_2$ | $ZrO_2$ | $SnO_2$ | Additive (wt %) $La_2O_3$ | ε | Q | TC ($\times 10^{-6}$/° C) |
|---|---|---|---|---|---|---|---|
| 1* | 20 | 56 | 24 | 4.0 | 32.7 | 5800 | −10 |
| 2 | 22 | 52 | 26 | " | 32.9 | 5700 | −12 |
| 3 | 22 | 58 | 20 | " | 33.0 | 6000 | +39 |
| 4 | 24 | 52 | 24 | " | 33.4 | 6500 | − 8 |
| 5 | 24 | 56 | 20 | " | 33.5 | 5900 | + 2 |
| 6 | 28 | 48 | 24 | " | 33.5 | 6000 | − 9 |
| 7 | 28 | 52 | 20 | " | 34.2 | 6600 | − 4 |
| 8 | 28 | 56 | 16 | " | 34.7 | 5300 | +22 |
| 9 | 32 | 44 | 24 | " | 34.5 | 6800 | −16 |
| 10 | 32 | 48 | 20 | " | 34.6 | 6800 | − 4 |
| 11 | 32 | 52 | 16 | " | 35.6 | 5100 | + 1 |
| 12 | 32 | 56 | 12 | " | 36.7 | 4700 | +25 |
| 13 | 33 | 58 | 9 | " | 37.8 | 4100 | +36 |
| 14 | 36 | 38 | 26 | " | 35.6 | 6000 | + 4 |
| 15 | 36 | 44 | 20 | " | 36.2 | 6800 | − 7 |
| 16 | 36 | 48 | 16 | " | 36.9 | 6100 | − 1 |
| 17 | 36 | 52 | 12 | " | 37.8 | 4900 | +11 |
| 18* | 40 | 36 | 24 | " | 42.2 | 6200 | +76 |
| 19 | 40 | 40 | 20 | " | 39.6 | 6000 | +24 |
| 20 | 40 | 44 | 16 | " | 39.0 | 6000 | + 4 |
| 21 | 40 | 48 | 12 | " | 39.0 | 5000 | + 9 |
| 22 | 43 | 38 | 19 | " | 39.2 | 5700 | +56 |
| 23 | 43 | 48 | 9 | " | 42.1 | 4900 | +24 |
| 24* | 46 | 42 | 12 | " | 45.6 | 5000 | +76 |
| 25 | 22 | 52 | 26 | 0.5 | 29.3 | 3500 | |
| 26 | " | " | " | 1 | 33.1 | 5200 | |
| 27 | " | " | " | 4 | 32.9 | 5700 | −12±5 |
| 28 | " | " | " | 10 | 32.9 | 4900 | |
| 29* | " | " | " | 20 | 32.8 | 2500 | |
| 30 | 32 | 52 | 16 | 0.5 | 32.4 | 3000 | |
| 31 | " | " | " | 4 | 35.6 | 5100 | |
| 32 | " | " | " | 10 | 35.5 | 4300 | + 1±5 |
| 33* | " | " | " | 20 | 35.5 | 2000 | |
| 34 | 36 | 38 | 26 | 0.5 | 31.8 | 4000 | |
| 35 | " | " | " | 1 | 35.7 | 5400 | |
| 36 | " | " | " | 4 | 35.6 | 6000 | + 4±5 |
| 37 | " | " | " | 10 | 35.6 | 4200 | |
| 38* | " | " | " | 20 | 35.6 | 2900 | |
| 39 | 40 | 48 | 12 | 0.5 | 36.1 | 3100 | |
| 40 | " | " | " | 1 | 39.1 | 4400 | |
| 41 | " | " | " | 4 | 39.0 | 5000 | + 9±5 |
| 42 | " | " | " | 10 | 39.0 | 4200 | |
| 43* | " | " | " | 20 | 38.9 | 2000 | |
| 44* | 20 | 56 | 24 | 0.5 | 33.6 | 8200 | −10 |
| 45 | 22 | 52 | 26 | " | 33.7 | 9000 | −11 |
| 46 | 22 | 58 | 20 | " | 33.8 | 8400 | +40 |
| 47 | 24 | 52 | 24 | " | 34.0 | 8900 | − 9 |
| 48 | 24 | 56 | 20 | " | 34.2 | 8400 | 0 |
| 49 | 28 | 48 | 24 | " | 34.5 | 8300 | −10 |
| 50 | 28 | 52 | 20 | " | 35.0 | 9000 | − 5 |
| 51 | 28 | 56 | 16 | " | 35.5 | 7800 | +20 |
| 52 | 32 | 44 | 24 | " | 35.3 | 9200 | −15 |
| 53 | 32 | 48 | 20 | " | 35.5 | 9500 | − 5 |
| 54 | 32 | 52 | 16 | " | 36.3 | 8400 | + 1 |
| 55 | 32 | 56 | 12 | " | 37.4 | 7100 | +21 |
| 56 | 33 | 58 | 9 | " | 38.6 | 6500 | +35 |
| 57 | 36 | 38 | 26 | " | 36.5 | 8600 | + 4 |
| 58 | 36 | 44 | 20 | " | 37.0 | 9200 | − 8 |
| 59 | 36 | 48 | 16 | " | 37.7 | 8500 | − 1 |
| 60 | 36 | 52 | 12 | " | 38.6 | 7400 | +10 |
| 61* | 40 | 36 | 24 | " | 43.1 | 8600 | +75 |

Table 1-continued

| Ex. | Basic composition (wt %) TiO$_2$ | ZrO$_2$ | SnO$_2$ | Additive (wt %) La$_2$O$_3$ | ε | Q | TC (× 10$^{-6}$/° C) |
|---|---|---|---|---|---|---|---|
| 62 | 40 | 40 | 20 | " | 40.4 | 8600 | +20 |
| 63 | 40 | 44 | 16 | " | 39.7 | 8400 | + 4 |
| 64 | 40 | 48 | 12 | " | 39.9 | 7500 | + 8 |
| 65 | 43 | 38 | 19 | " | 44.0 | 8100 | +51 |
| 66 | 43 | 48 | 9 | " | 42.9 | 7400 | +23 |
| 67* | 46 | 42 | 12 | " | 46.3 | 7600 | +73 |
| 68 | 22 | 52 | 26 | 0.2 | 33.4 | 8200 | |
| 69 | " | " | " | 0.5 | 33.7 | 9000 | |
| 70 | " | " | " | 1 | 33.0 | 8800 | |
| 71 | " | " | " | 3 | 31.5 | 7600 | −11±7 |
| 72 | " | " | " | 5 | 30.9 | 7200 | |
| 73 | " | " | " | 10 | 29.5 | 6000 | |
| 74* | " | " | " | 20 | 28.4 | 4200 | |
| 75 | 32 | 52 | 16 | 0.5 | 36.3 | 8400 | |
| 76 | " | " | " | 1 | 35.7 | 7600 | +1±7 |
| 77 | " | " | " | 10 | 32.1 | 5500 | |
| 78* | " | " | " | 20 | 31.0 | 4100 | |
| 79 | 36 | 38 | 26 | 0.2 | 36.4 | 8000 | |
| 80 | " | " | " | 0.5 | 36.5 | 8600 | |
| 81 | " | " | " | 1 | 35.9 | 8300 | +4±7 |
| 82 | " | " | " | 3 | 34.5 | 7200 | |
| 83 | " | " | " | 10 | 32.2 | 5800 | |
| 84* | " | " | " | 20 | 31.1 | 4100 | |
| 85 | 40 | 48 | 12 | 0.5 | 39.9 | 7500 | |
| 86 | " | " | " | 1 | 39.2 | 6600 | +8±7 |
| 87 | " | " | " | 5 | 36.9 | 5500 | |
| 88* | " | " | " | 20 | 34.4 | 3400 | |
| 89* | 28 | 58 | 14 | 1.5 | 35.0 | 5100 | +32 |
| 90 | 30 | 46 | 24 | " | 33.0 | 7600 | −20 |
| 91 | 30 | 30 | 12 | " | 36.0 | 4800 | +37 |
| 92 | 31 | 51 | 18 | " | 34.3 | 6100 | − 1 |
| 93 | 31 | 54 | 15 | " | 35.4 | 5900 | +13 |
| 94* | 32 | 42 | 26 | " | 33.0 | 7500 | −52 |
| 95 | 33 | 58 | 9 | " | 37.5 | 4500 | +38 |
| 96 | 34 | 45 | 21 | " | 35.0 | 7800 | −10 |
| 97 | 34 | 48 | 18 | " | 35.5 | 7400 | − 3 |
| 98 | 34 | 51 | 15 | " | 36.1 | 6400 | + 1 |
| 99 | 34 | 54 | 12 | " | 37.5 | 5400 | +12 |
| 100 | 36 | 40 | 24 | " | 35.0 | 7000 | −33 |
| 101 | 37 | 42 | 21 | " | 36.2 | 7000 | − 9 |
| 102 | 37 | 45 | 18 | " | 36.6 | 7400 | − 7 |
| 103 | 37 | 48 | 15 | " | 37.7 | 6300 | + 1 |
| 104 | 37 | 51 | 12 | " | 37.7 | 5500 | + 8 |
| 105 | 40 | 42 | 18 | " | 39.0 | 7000 | + 7 |
| 106 | 40 | 45 | 15 | " | 38.5 | 6300 | + 4 |
| 107 | 40 | 48 | 12 | " | 38.9 | 5900 | + 5 |
| 108 | 43 | 40 | 17 | " | 42.5 | 6500 | +32 |
| 109 | 43 | 48 | 9 | " | 41.9 | 5600 | +23 |
| 110* | 46 | 42 | 12 | " | 46.6 | 6000 | +75 |

Table 2

| Example | Basic composition (wt %) TiO$_2$ | ZrO$_2$ | SnO$_2$ | Additive (wt %) ZnO | La$_2$O$_3$ | ε | Q | TC (× 10$^{-6}$/° C) |
|---|---|---|---|---|---|---|---|---|
| 111* | 20 | 56 | 24 | 1.0 | 0.5 | 33.8 | 6500 | − 9 |
| 112 | 22 | 52 | 26 | " | " | 33.9 | 6400 | −12 |
| 113 | 22 | 58 | 20 | " | " | 33.9 | 6700 | +43 |
| 114 | 24 | 52 | 24 | " | " | 34.2 | 7300 | − 9 |
| 115 | 24 | 56 | 20 | " | " | 34.4 | 6500 | 0 |
| 116 | 28 | 48 | 24 | " | " | 34.7 | 6800 | −11 |
| 117 | 28 | 52 | 20 | " | " | 35.2 | 7200 | − 5 |
| 118 | 28 | 56 | 16 | " | " | 35.7 | 5900 | +21 |
| 119 | 32 | 44 | 24 | " | " | 35.6 | 7400 | −16 |
| 120 | 32 | 48 | 20 | " | " | 35.7 | 7500 | − 4 |
| 121 | 32 | 52 | 16 | " | " | 36.5 | 5800 | + 1 |
| 122 | 32 | 56 | 12 | " | " | 37.5 | 6400 | +20 |
| 123 | 33 | 58 | 9 | " | " | 38.8 | 4800 | +38 |
| 124 | 36 | 38 | 26 | " | " | 36.7 | 6900 | + 4 |
| 125 | 36 | 44 | 20 | " | " | 37.2 | 7700 | − 7 |
| 126 | 36 | 48 | 16 | " | " | 37.9 | 6800 | − 1 |
| 127 | 36 | 52 | 12 | " | " | 38.8 | 5500 | +12 |
| 128* | 40 | 36 | 24 | " | " | 43.3 | 6900 | +79 |
| 129 | 40 | 40 | 20 | " | " | 40.6 | 6700 | +21 |
| 130 | 40 | 44 | 16 | " | " | 39.9 | 6600 | + 4 |
| 131 | 40 | 48 | 12 | " | " | 40.2 | 5700 | + 7 |
| 132 | 43 | 38 | 19 | " | " | 44.2 | 6400 | +55 |
| 123 | 43 | 48 | 9 | " | " | 43.1 | 5700 | +25 |
| 134* | 46 | 42 | 12 | " | " | 46.5 | 5600 | +75 |
| 135 | 22 | 52 | 26 | 0.5 | 0.2 | 34.3 | 6800 | |
| 136 | " | " | " | " | 1 | 34.3 | 5000 | |
| 137* | " | " | " | " | 3 | 34.2 | 500 | |

Table 2-continued

| Example | Basic composition (wt %) TiO₂ | ZrO₂ | SnO₂ | Additive (wt %) ZnO | La₂O₃ | ε | Q | TC (× 10⁻⁶/° C) |
|---|---|---|---|---|---|---|---|---|
| 138 | " | " | " | 1 | 0.5 | 33.9 | 6400 | −12±5 |
| 139 | " | " | " | 3 | 2 | 33.0 | 5000 | |
| 140 | " | " | " | 7 | 0.2 | 31.9 | 4900 | |
| 141* | " | " | " | " | 3 | 31.9 | 300 | |
| 142* | " | " | " | 10 | 2 | 30.7 | 500 | |
| 143 | 32 | 52 | 116 | 0.5 | 0.2 | 36.7 | 6200 | |
| 144* | " | " | " | " | 3 | 36.6 | 200 | |
| 145 | " | " | " | 1 | 0.5 | 36.5 | 5800 | |
| 146 | " | " | " | " | 1 | 36.4 | 4900 | |
| 147 | " | " | " | 3 | " | 35.6 | 5500 | + 1±5 |
| 148 | " | " | " | " | 2 | 35.5 | 4300 | |
| 149* | " | " | " | " | 3 | 35.5 | 300 | |
| 150 | " | " | " | 7 | 0.2 | 34.3 | 4200 | |
| 151* | " | " | " | " | 3 | 34.2 | 200 | |
| 152* | " | " | " | 10 | 2 | 33.1 | 300 | |
| 153 | 36 | 38 | 26 | 0.5 | 0.5 | 36.7 | 6900 | |
| 154 | " | " | " | " | 2 | 36.9 | 4900 | |
| 155* | " | " | " | " | 3 | 36.8 | 300 | + 4±5 |
| 156 | " | " | " | 1 | 2 | 36.7 | 4500 | |
| 157 | " | " | " | 7 | 0.5 | 34.8 | 4500 | |
| 158* | " | " | " | " | 3 | 34.6 | 200 | |
| 159 | 43 | 38 | 19 | 0.5 | 0.2 | 40.5 | 6100 | |
| 160* | " | " | " | " | 3 | 40.4 | 500 | |
| 161 | " | " | " | 1 | 0.5 | 40.2 | 5700 | |
| 162 | " | " | " | 3 | 1 | 39.3 | 5400 | + 7±6 |
| 163 | " | " | " | " | 2 | 39.2 | 4800 | |
| 164* | " | " | " | 7 | 3 | 38.1 | 200 | |
| 165* | " | " | " | 10 | 1 | 36.8 | 1900 | |
| 166* | 20 | 56 | 24 | 1.5 | 0.25 | 32.5 | 6800 | −12 |
| 167 | 22 | 52 | 26 | " | " | 32.7 | 6600 | − 8 |
| 168 | 22 | 58 | 20 | " | " | 32.8 | 6900 | +39 |
| 169 | 24 | 52 | 24 | " | " | 33.1 | 7500 | − 9 |
| 170 | 24 | 56 | 20 | " | " | 33.3 | 6900 | − 1 |
| 171 | 28 | 48 | 24 | " | " | 33.5 | 6900 | −11 |
| 172 | 28 | 52 | 20 | " | " | 34.0 | 7500 | − 4 |
| 173 | 28 | 56 | 16 | " | " | 34.6 | 6200 | +21 |
| 174 | 32 | 44 | 24 | " | " | 34.3 | 7700 | −16 |
| 175 | 32 | 48 | 20 | " | " | 34.5 | 7800 | − 5 |
| 176 | 32 | 52 | 16 | " | " | 35.4 | 6000 | 0 |
| 177 | 32 | 56 | 12 | " | " | 36.5 | 5600 | +23 |
| 178 | 33 | 58 | 9 | " | " | 37.6 | 5100 | +36 |
| 179 | 36 | 38 | 26 | " | " | 35.4 | 7000 | + 7 |
| 180 | 36 | 44 | 20 | " | " | 36.0 | 7700 | − 9 |
| 181 | 36 | 48 | 16 | " | " | 36.7 | 7000 | − 1 |
| 182 | 36 | 52 | 12 | " | " | 37.7 | 5800 | + 9 |
| 183* | 40 | 36 | 24 | " | " | 42.0 | 7100 | +78 |
| 184 | 40 | 40 | 20 | " | " | 39.4 | 7000 | +18 |
| 185 | 40 | 44 | 16 | " | " | 38.8 | 6900 | + 3 |
| 186 | 40 | 48 | 12 | " | " | 38.9 | 5900 | + 9 |
| 187 | 43 | 38 | 19 | " | " | 39.0 | 6600 | +52 |
| 188 | 43 | 48 | 9 | " | " | 42.0 | 5800 | +26 |
| 189* | 46 | 42 | 12 | " | " | 45.4 | 6000 | +78 |
| 190 | 22 | 52 | 26 | 0.5 | 0.5 | 32.9 | 7300 | |
| 191 | " | " | " | " | 1 | 32.6 | 7600 | |
| 192 | " | " | " | " | 10 | 30.5 | 6100 | |
| 193* | " | " | " | " | 20 | 29.7 | 5000 | |
| 194 | " | " | " | 1.5 | 1 | 32.3 | 7100 | |
| 195 | " | " | " | " | 3 | 31.6 | 7200 | |
| 196 | " | " | " | " | 10 | 30.5 | 6400 | |
| 197* | " | " | " | " | 20 | 29.9 | 5500 | −8±4 |
| 198 | " | " | " | 3.0 | 1 | 31.6 | 6500 | |
| 199 | " | " | " | " | 3 | 30.6 | 6400 | |
| 200* | " | " | " | " | 20 | 28.6 | 4400 | |
| 201 | " | " | " | 7.0 | 0.5 | 30.5 | 5200 | |
| 202 | " | " | " | " | 3 | 29.3 | 5000 | |
| 203* | " | " | " | " | 20 | 27.4 | 3000 | |
| 204* | " | " | " | 10.0 | 3 | 28.4 | 4500 | |
| 205* | " | " | " | " | 10 | 27.2 | 3600 | |
| 206 | 32 | " | 16 | 0.5 | 1 | 35.4 | 6900 | |
| 207 | " | " | " | " | 10 | 34.3 | 5400 | |
| 208* | " | " | " | " | 20 | 33.2 | 4300 | +1±5 |
| 209 | " | " | " | 3.0 | 3 | 33.5 | 5800 | |
| 210 | " | " | " | 7.0 | 0.5 | 33.2 | 4500 | |
| 211* | " | " | " | 10.0 | 3 | 31.1 | 3900 | |
| 212 | 36 | 38 | 26 | 0.5 | 1 | 35.5 | 7800 | |
| 213* | " | " | " | " | 20 | 32.6 | 5500 | |
| 214 | " | " | " | 1.5 | 3 | 34.4 | 7500 | |
| 215 | " | " | " | " | 10 | 33.3 | 6800 | −7±4 |
| 216 | " | " | " | 3 | 3 | 33.4 | 6800 | |

Table 2-continued

| Example | Basic composition (wt %) TiO$_2$ | ZrO$_2$ | SnO$_2$ | Additive (wt %) ZnO | La$_2$O$_3$ | ε | Q | TC (× 10$^{-6}$/° C) |
|---|---|---|---|---|---|---|---|---|
| 217 | " | " | " | 7 | 10 | 31.1 | 4500 | |
| 218* | " | " | " | " | 20 | 30.2 | 3400 | |
| 219* | " | " | " | 10 | 10 | 30.0 | 4000 | |
| 220 | 40 | 48 | 12 | 0.5 | 10 | 36.8 | 5300 | +9±4 |
| 221 | " | " | " | 1.5 | 3 | 37.8 | 6400 | |
| 222 | " | " | ' | 3 | 1 | 37.9 | 5800 | |
| 223* | " | " | " | 7 | 20 | 33.7 | 2300 | |
| 224* | " | " | " | 10 | 3 | 34.7 | 3800 | |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dielectric ceramic composition for high frequencies consisting essentially of 83 to 99.8 wt% of a basic composition composed of 22 to 43 wt% of titanium dioxide dioxide, 38 to 58 wt% of zirconium and 9 to 26 wt% of stannic oxide, and 0.2 to 17 wt% of one or two additives selected from the group consisting of lanthanum oxide and cobaltic oxide.

2. A dielectric ceramic composition according to claim 1 wherein said additive is lanthanum oxide and wherein said lanthanum oxide is present in an amount of from 0.5 to 10 wt%.

3. A dielectric ceramic composition according to claim 1 wherein said additive is cobaltic oxide and wherein said cobaltic oxide is present in an amount of from 0.2 to 10 wt%.

4. A dielectric ceramic composition according to claim 1 wherein said additive is lanthanum oxide and further containing zinc oxide, said lanthanum oxide being present in an amount of not more than 2 wt%, said zinc oxide being present in an amount of not more than 7 wt%.

5. A dielectric ceramic composition according to claim 1 wherein said additive is cobaltic oxide and further containing zinc oxide, said cobaltic oxide being present in an amount of 0.2 to 10 wt%, said zinc oxide being present in an amount of not more than 7 wt%.

* * * * *